(12) United States Patent
Jokinen (10) Patent No.: US 9,307,381 B2
(45) Date of Patent: Apr. 5, 2016

(54) OPTIMIZED EMERGENCY ALERT MESSAGE DELIVERY

(75) Inventor: Harri Jokinen, Pertteli (FI)

(73) Assignee: Nokia Technologies Oy, Espoo (FI)

( * ) Notice: Subject to any disclaimer, the term of this patent is extended or adjusted under 35 U.S.C. 154(b) by 551 days.

(21) Appl. No.: 12/600,270

(22) PCT Filed: May 16, 2008

(86) PCT No.: PCT/IB2008/051945
§ 371 (c)(1),
(2), (4) Date: Nov. 16, 2009

(87) PCT Pub. No.: WO2008/139433
PCT Pub. Date: Nov. 20, 2008

(65) Prior Publication Data
US 2010/0159870 A1 Jun. 24, 2010

Related U.S. Application Data

(60) Provisional application No. 60/930,401, filed on May 16, 2007.

(51) Int. Cl.
*H04W 4/22* (2009.01)
*H04W 76/00* (2009.01)

(52) U.S. Cl.
CPC .............. *H04W 4/22* (2013.01); *H04W 76/007* (2013.01)

(58) Field of Classification Search
CPC ...... H04W 76/007; H04W 76/00; H04W 4/22
USPC ............ 455/404.1, 412.1–412.2, 422.1, 458, 455/515, 527, 90.1; 370/328, 312
See application file for complete search history.

(56) References Cited

U.S. PATENT DOCUMENTS

| 6,041,047 A * | 3/2000 | Diachina et al. .............. 370/347 |
| 7,623,881 B2 * | 11/2009 | An et al. ........................ 455/515 |
| 2002/0068557 A1 * | 6/2002 | Heo ................................ 455/422 |
| 2005/0064886 A1 | 3/2005 | Kim et al. ..................... 455/466 |
| 2005/0152475 A1 * | 7/2005 | Lakkis .......................... 375/316 |
| 2007/0030144 A1 * | 2/2007 | Titus et al. .................... 340/534 |
| 2007/0153718 A1 | 7/2007 | Kim et al. ..................... 370/320 |
| 2009/0022282 A1 * | 1/2009 | Steingass et al. ............... 379/45 |

FOREIGN PATENT DOCUMENTS

WO 9732439 A 9/1997
WO 2004008698 A 1/2004

OTHER PUBLICATIONS

International Search Report and Written Opinion Issued for PCT Application PCT/IB2009/051945 sent on Nov. 19, 2008, p. 1-13.

(Continued)

*Primary Examiner* — Marcos Torres
(74) *Attorney, Agent, or Firm* — Harrington & Smith (57) ABSTRACT

An apparatus, method and system for providing an emergency alert message in a communication system. In one embodiment, the apparatus includes a transceiver (250) configured to receive an alert of an emergency message on a plurality of broadcast subchannels and to receive at least one message segment associated with the emergency message on the plurality of broadcast subchannels. The apparatus also includes a processor (220) configured to reconstruct the emergency message from the at least one message segment associated therewith.

18 Claims, 5 Drawing Sheets

(56) References Cited

OTHER PUBLICATIONS

3GPP TS 05.02 V8.10.0 3rd Generation Partnership Project; Technical Specification Group GSM/EDGE Radio Access Network; Multiplexing and Multiple Access on the Radio Path, (1999), p. 1-77.

3GPP TS 03.41 V7.4.0 3rd Generation Partnership Project; Technical Specification Group Terminals; Technical Realization of Cell Broadcast Service (CBS), Release 1998, p. 1-31.

ETSI TS 100 900 V7.2.0 (Jul. 1999), Technical Specification, Digital Cellular Telecommunications System (Phase 2+); Alphabets and Language Specific Information, (GSM 03.38 version 7.2.0 Release 1998), (pp. 1-20).

3GPP TS 05.02 V7.7.0 (Aug. 2001), Technical Specification, 3rd Generation Partnership Project; Technical Specification Group GSM/EDGE Radio Access Network; Multiplexing and multiple access on the radio path, (Release 1998), (62 pages).

* cited by examiner

OPTIMIZED EMERGENCY ALERT MESSAGE DELIVERY

RELATED APPLICATION

This application was originally filed as PCT Application No. PCT/IB2008/051945 on May 16, 2008 and claims priority to US Provisional Application No. 60/930401 filed on May 16, 2007, which is incorporated herein by reference in its entirety.

TECHNICAL FIELD

The present invention is directed, in general, to communication systems and, more particularly, to a system and method for transmitting broadcast messages in communication systems.

BACKGROUND

A global system for mobile telecommunications ("GSM"), enhanced data rates for GSM evolution ("EDGE") radio access network ("GERAN") is a part of the widely deployed cellular GSM system, and also of the combined universal mobile telecommunications system ("UMTS")/GSM network. GERAN is the acronym used to describe a GSM with EDGE, which is the radio portion of the network that joins base stations and base station controllers. A telephone operator's network typically includes one or more GERANs, coupled with universal mobile terrestrial radio access networks ("UTRANs"). The standards for GERAN are maintained by the 3rd Generation Partnership Project ("3GPP").

A cellular broadcast service ("CBS") is a mobile telecommunication service that is intended to provide different kinds of short broadcast messages, and has recently been considered as an option to send a notice about emergencies or disaster information to subscribing mobile stations in a selected area of concern, which can be an area of a few blocks, an entire state, or even an entire country. A specification describing cellular broadcast service is provided in 3GPP TS 03.41, entitled "3rd Generation Partnership Project; Technical Specification Group Terminals; Technical Realization of Cell Broadcast Service (CBS), Release 1998," Version 7.4.0, (September 2000), which is incorporated herein by reference. The cellular broadcast service relates to a cellular network-based short message broadcast service that has been planned for emergency alert services by the 3rd Generation Partnership Project.

An important consideration for the planning and design of a cellular broadcast service is the message delivery time required for delivery of an emergency message to an end user in a designated area of concern. Absolute limits for message delivery time have not been presently set, but a rapid message delivery process is an obvious need. Short delivery periods are challenging in present cellular networks, even for a simple text alert on the cellular broadcast service, indicating an important need to reduce the message delivery time. Therefore, what is needed in the art is a system and method that allows for more rapid delivery of an emergency message on a broadcast channel to an end user in a designated area of concern.

SUMMARY OF THE INVENTION

These and other problems are generally solved or circumvented, and technical advantages are generally achieved, by embodiments of the present invention, which include an apparatus, method and system for providing an emergency alert message in a communication system having a base station and a mobile station. In one embodiment, the base station includes a processor configured to generate an alert for an emergency message and to segment the emergency message into at least one message segment for transmission on a plurality of broadcast subchannels. The base station also includes a transceiver configured to transmit the alert for the emergency message on the plurality of broadcast subchannels and to transmit the at least one message segment associated with the emergency message on the plurality of broadcast subchannels. In one embodiment, the mobile station includes a transceiver configured to receive the alert of the emergency message on the plurality of broadcast subchannels and to receive the at least one message segment associated with the emergency message on the plurality of broadcast subchannels. The mobile station also includes a processor configured to reconstruct the emergency message from the at least one message segment associated therewith. The processor of the mobile station is also configured to reconstruct the emergency message from a plurality of message segments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system, apparatus, and method for communicating an emergency broadcast message to many mobile stations by incorporating copies thereof staggered in time on a plurality of broadcast subchannels in a communication system.

A broadcast emergency message is generally transmitted to alert a population of end users via mobile stations in an affected area of a time-critical situation. A broadcast emergency message displays information related to the emergency message on a mobile station, such as in the format of a text message, and may have a special ring tone or other alerting mechanism, depending on the mobile station. A special symbol may be included in a message to assure the end user that the message is from authorized officials.

The emergency message is broadcast from cell towers in an affected area, making the message area specific. For example, a particular town can be advised of an alert status, whereas a nearby town can be advised of a different warning level. If a mobile station is in the affected area, it receives the emergency message. If the mobile station is not in the affected area, the emergency message will not be broadcast by the base station providing service for that particular area and will then not be received. Emergency messages can also be selectively received in a language chosen by the end user of the mobile station.

The cellular broadcast service is not limited by the number of active mobile stations in a receiving area. The cellular broadcast service uses cellular broadcast channels ("CBCHs") that are received by all active mobile stations, not mobile station specific traffic channels ("TCHs"). By using cellular broadcast channels, potentially hundreds of millions of mobile stations can receive an emergency message in a brief period of time without causing a communication system overload.

The cellular broadcast service relates to a cellular network-based short message broadcast service that has been planned for emergency alert services by the 3rd Generation Partnership Project. GERAN cellular broadcast service has been viewed as a potential platform to deliver emergency alerts because of its broadcast nature and legacy support. GERAN networks provide worldwide coverage, which is an order of magnitude better than other feasible communication options. An emergency alert service in a basic form is being built in GSM/GERAN. An improved emergency alert service would work with limited modifications to GERAN cellular broadcast service with certain improvements added to enhance the service for new mobile stations that support those enhancements.

The GERAN cellular broadcast service is a potential alerting communication solution that is complemented by other means for message delivery of emergency alerts. Since it is a pure broadcast feature, it is free of network congestion when a message is delivered to all or to a large number of cellular network mobile stations. The GERAN cellular broadcast service bit rate, however, is limited, which affects message delivery time. Absolute limits for message delivery time have not been presently set, but a rapid message delivery process is an obvious need. As an example, some Japanese requirements for emergency message delivery time are as short as five seconds to allow significant response time for an end user for a time-critical alert such as an earthquake alert. In present cellular system designs, such short delivery periods are challenging, even for a text alert on the cellular broadcast service in view of the limited data rate and broadcast channel block size of a cellular broadcast channel, and the need for message repetition, indicating an important need to reduce emergency message delivery time.

The GERAN cellular broadcast service includes two parallel cellular broadcast channels including a basic channel and an extended channel, as described in 3GPP TS 05.02, entitled "3rd Generation Partnership Project; Technical Specification Group GSM/EDGE; Radio Access Network; Multiplexing and multiple access on the radio path (Release 1998)," Version 7.7.0 (August 2001), which is incorporated herein by reference. In other cellular communication systems, more than two parallel cellular broadcast channels may be used. From a standard-setting point of view, the two (or more) cellular broadcast channels are now configured to deliver content independently from each other. An emergency message would normally be sent on one of the cellular broadcast channels and would ordinarily be segmented over multiple cellular broadcast channel radio blocks. As described in Section 5 of TD 100 900, entitled "Digital cellular telecommunications system (Phase 2+); Alphabets and language-specific information (GSM-03.38 version 7.2.0 Release 1998)," Version 7.2.0 (July 1999), which is incorporated herein by reference, a single cellular broadcast channel radio block can carry 93 characters if default character coding is used.

Normally, cellular broadcast service messages, and emergency alert messages specifically, are significantly longer and should be segmented to be delivered on multiple cellular broadcast channel radio blocks. A specific emergency alert message would also be repeated multiple times to correct reception errors arising from momentary bad transmission conditions, etc., as well as due to the possibility of some mobile stations entering a cell late where an alert is being broadcast. As introduced herein, an emergency alert would be scheduled on both cellular broadcast channel subchannels, but staggered in time, and the mobile station receiving the emergency alert message would read both subchannels and combine the full message from the two parts in each subchannel to assemble a full message in roughly half of the time of the current approach. Ideally, the full emergency message is transmitted on each subchannel, and the two subchannels are staggered by a fifty percent offset of their relative timing. Thus, the full message can be received by an end user in roughly half the time required to transmit the full message on one subchannel.

This arrangement of scheduling the emergency alert on two subchannels would also statistically help legacy mobile stations that support both cellular broadcast channel subchannels when the legacy mobile station enters a cell wherein the emergency alert broadcast is ongoing. On the average, the time to find the start of a message delivery would be reduced by about half.

Dual subchannel transmission of an emergency alert message specifically helps new mobile stations that can respond to parallel message transmission. In a normal case, delivery of an emergency message would be scheduled on one of the subchannels (preferably the basic cellular broadcast service uses a cellular broadcast channel because it generally has a higher priority) to start immediately after the mobile stations are alerted of the new cellular broadcast service message. The alerts can be made from a cellular broadcast service discontinuous reception ("DRX") scheduling message, or from other enhancements of emergency alert features like an indicator on a paging message indicating the existence of the emergency alert, thereby avoiding the latency from the cellular broadcast service discontinuous reception. The paging indication enhancement may employ methods currently available. Once a mobile station is alerted of the new emergency alert message on both cellular broadcast channels, the mobile station will start reading both cellular broadcast channels in parallel. Since the message content is staggered on the two subchannels, the mobile station is able to reconstruct a full message in roughly half the time compared to the current approach of using only one subchannel, by combining half of the message from each subchannel. The mobile station is able to reconstruct a full message within half the time it takes to deliver the full message on one of the subchannels, irrespectively of the reception starting time relative to the broadcast message delivery start time on either of the subchannels because multiple repetitions of the cellular broadcast service message are assumed on both subchannels.

On the network side of the communication channel, one stand-alone dedicated control channel ("SDCCH") is reserved for cellular broadcast service irrespective of whether only one or both of the subchannels are being used. The emergency alert would have higher priority than any other (commercial) cellular broadcast service content or traffic. Thus, a base station can pre-empt (if necessary) both cellular broadcast channel subchannels and schedule the emergency alert content with a fifty percent offset in relative timing on the two subchannels.

A mobile station can reconstruct a cellular broadcast service message from multiple segments of repeated transmissions of the same message content using known techniques. The intent and structure of the current approach solves the problem of lost message segments when cellular broadcast channel reception, specifically extended cellular broadcast channel reception, needs to be interrupted at a mobile station by other tasks. Similarly, the same message content can be combined from two separate segments of a full message where the first message segment is received from the basic cellular broadcast channel and the second message segment is received in parallel from the extended cellular broadcast channel. As described in Section 9.3.2 of 3GPP TS 03.41, entitled "3rd Generation Partnership Project; Technical Specification Group Terminals; Technical Realization of Cell Broadcast Service (CBS) (Release 1998)," Version 7.4.0 (September 2000), which is incorporated herein by reference, each message segment includes, among other data, a page parameter that guides the mobile station to combine cellular broadcast channel radio blocks in a correct order and number to assemble a full cellular broadcast message. There is no loss of network resource utilization as a result of deploying emergency message content in two subchannels of a cellular communication system. There may be an increase in complexity, however, at the base station from optimized scheduling of emergency alert content on the two subchannels.

Improved delivery time for critical emergency messages is an obvious advantage of dividing message content into two subchannels. Message delivery time can be halved for new mobile stations that support subchannel message combining Delivery time for emergency messages to certain legacy mobile stations will also be reduced, even halved in certain cases.

Figure 1:
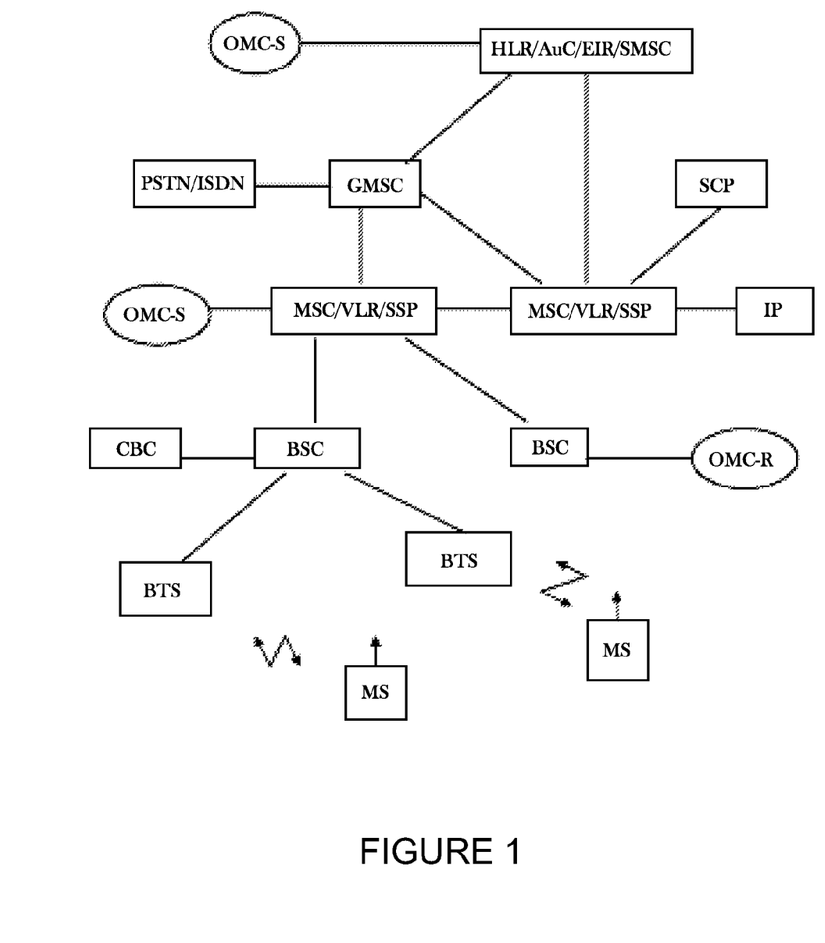
FIG. 1 illustrates a system level diagram of an exemplary cellular telecommunications system such as a GSM system capable of providing cellular broadcast services to mobile stations, constructed according to an embodiment of the present invention.

Turning now to FIG. 1, illustrated is a system level diagram of an exemplary cellular telecommunications system such as a GSM system capable of providing cellular broadcast services to mobile stations. As illustrated, a mobile station (designated "MS") communicates over a radio link with a base transceiver station or base station (designated "BTS"), which in turn is coupled to a base station controller (designated "BSC"). It should be understood that systems herein may be distributed as shown or integrated into single entities with subsystems.

A mobile service switching center (designated "MSC") is the exchange that performs the switching and signaling functions for mobile stations located in a geographical area, such as procedures for basic call handling, call handover, and supplementary services. A cellular broadcast center (designated "CBC") is the support node used for providing cellular broadcast service to the mobile stations. The cellular broadcast center generally initiates a broadcast message by sending a fixed-length cellular broadcast short message to a base station controller for each language provided by the cell. The cellular broadcast center determines, inter alia, the set of cells/base stations to which a message should be broadcast, the rate at which the message should be repeated, and the geographical scope of each message.

A home location register (designated "HLR") is the functional database entity containing data related to the mobile stations and the corresponding subscribed services. The management of end user data is done through operator terminals that are connected to the home location register. A service control point (designated "SCP") is a real-time database system that contains various service logic programs for enabling executions of intelligent network services subscribed to by the end user. When a service switching point (designated "SSP") determines that a call is an intelligent network call, the service switching point formulates a query to the service control point to obtain call processing information upon receipt of the initial query message from service switching point, and the service control point identifies the appropriate end user service plan. The service switching point is the switch that has the capability to identify calls associated with intelligent network services and invokes service logic residing in the service control point. The service switching point uses the intelligent network application part ("INAP") for interfacing with the service control point.

A visitor location register (designated "VLR") is the functional unit that dynamically stores end users information, such as location area, when a mobile station associated therewith is located in the area controlled by the visitor location register. When a roaming mobile station enters a mobile service switching center area, the mobile service switching center informs the associated visitor location register, and the mobile station enters a registration procedure through which it is assigned a network address that serves to route incoming calls to that mobile station.

An equipment identity register (designated "EIR") is the functional entity that contains a database for storing selected data of a mobile station used in the system. An authentication center (designated "AuC") is associated with a home location register and stores an identity key for each mobile station registered with the associated home location register. An intelligent peripheral (designated "IP") is an adjunct node to a service switching point/service control point and provides capabilities such as playing an announcement, converting text to speech, recognizing speech, collecting digits dialed by the mobile station, and other mode capabilities for providing advanced intelligent network services. An intelligent peripheral may be connected either to the service switching point or the service control point depending upon the requirements and configuration of the network. An intelligent peripheral may also be co-located with the service switching point.

An operation and maintenance center (designated "OMC") is the functional entity through which a network operator monitors and controls the system by performing functions such as hardware installation, traffic management, performance data analysis, tracking of end users and equipment, configuration management, end user administration, management of mobile equipment, and management of tariffs, charging and billing. An operation and maintenance center for the radio network (e.g., employing base stations) is termed an OMC-R and is responsible for all the above functions therefor. An operation and maintenance center for a network and switch subsystem is termed as OMC-S, which is distributed across various nodes of the cellular network. A cellular communication system such as the GSM communication system illustrated in FIG. 1 is capable of providing cellular broadcast service over at least two broadcast channels to the mobile stations.

Figure 2:
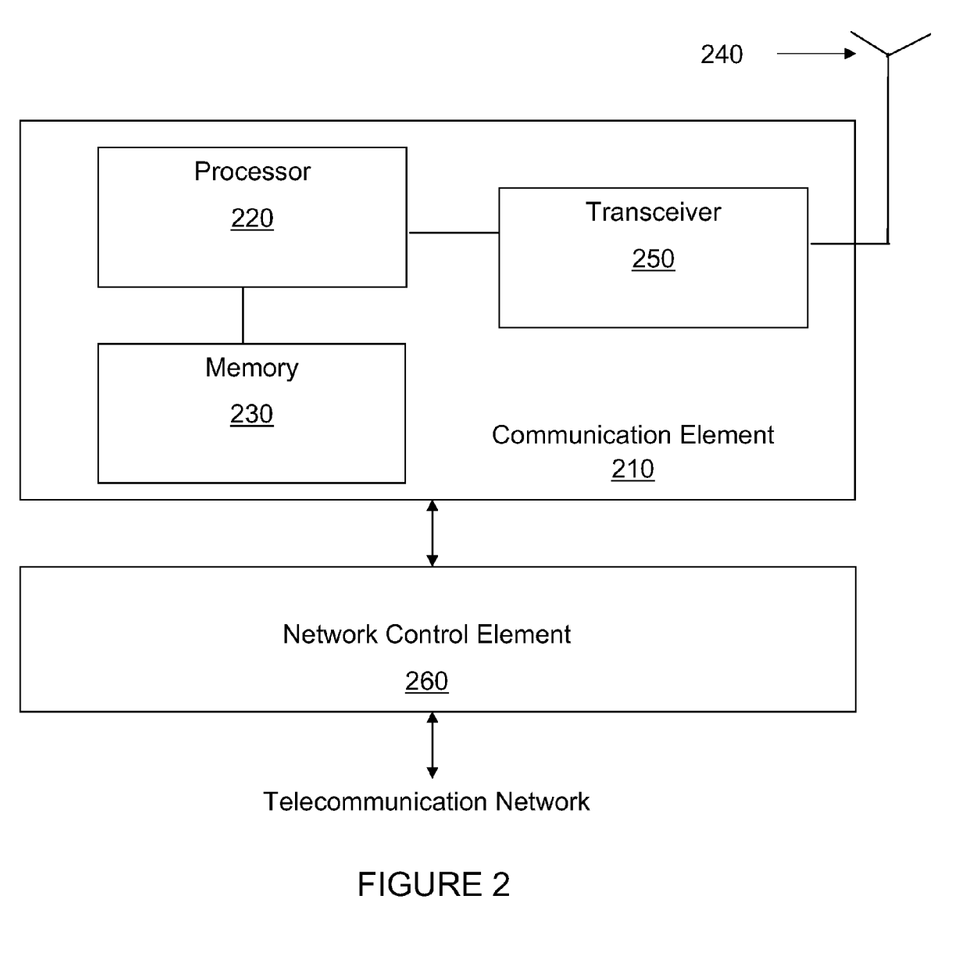
FIG. 2 illustrates a system level diagram of a communication element of a communication system that provides an environment for application of the principles of the present invention.

Turning now to FIG. 2, illustrated is a system level diagram of a communication element 210 of a communication system that provides an environment for application of the principles of the present invention. The communication element 210 may represent, without limitation, a base station, a mobile station, or a network control element. The communication element 210 includes a processor 220, memory 230 that stores programs and data of a temporary or more permanent nature, an antenna 240, and a radio frequency transceiver 250 coupled to the antenna 240 and the processor 220 for bidirectional wireless communications. The communication element 210 may provide point-to-point and/or point-to-multipoint communication services.

The communication element 210 such as a base station in a cellular network may be coupled via a base station controller to a communication network element such as a network control element 260 of a public switched telecommunication network. The network control element 260 may, in turn, be formed with a processor, memory, and other electronic elements. The network control element 260 preferably provides access to a telecommunication network such as a public switched telecommunication network. The access may be provided by a fiber optic, coaxial, twisted pair, or microwave communication link coupled to an appropriate link terminating element. A communication element 210 formed as a mobile station is generally a self-contained device intended to be carried by an end user.

The processor 220 in the communication element, which may be implemented with a plurality of processing devices, performs functions associated with its operation including, without limitation, encoding and decoding of individual bits forming a communication message, formatting of information, and overall control of the communication element 210, including processes related to management of resources. Exemplary functions related to management of resources include, without limitation, hardware installation, traffic management, performance data analysis, tracking of end users and equipment, configuration management, and end user administration, management of mobile equipment, and management of tariffs, charging, and billing. The execution of all or portions of particular functions or processes related to management of resources may be performed in equipment separate from and coupled to the communication element 210, with the results of such functions or processes communicated for execution to the communication element 210. The processor 220 of the communication element 210 may be of any type suitable to the local application environment, and may include one or more of general purpose computers, special purpose computers, microprocessors, digital signal processors ("DSPs"), and processors based on a multi-core processor architecture, as non-limiting examples.

The transceiver 250 of the communication element 210 modulates information onto a carrier waveform for transmission by the communication element 210 via the antenna 240 to another communication element. The transceiver 250 demodulates information received via the antenna 240 for further processing by other communication elements.

The memory 230 of the communication element 210 as introduced above may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 230 may include program instructions that, when executed by an associated processor, enable the communication element 210 to perform tasks as described herein. Exemplary embodiments of the system, subsystems and modules as described herein may be implemented, at least in part, by computer software executable by processors of, for instance, the mobile station and the base station, or by hardware, or by combinations thereof. As will become more apparent, systems, subsystems and modules may be embodied in the communication element as illustrated and described above.

According to the principles of the present invention, when the communication element 210 performs as a base station of a communication system, the processor 220 is configured to generate an alert for an emergency message and to segment the emergency message into at least one message segment for transmission on a plurality of broadcast subchannels. The emergency message may include a text message. The alert and the emergency message (and/or segments thereof) may be stored in the memory 230. The transceiver 250 of the base station is configured to transmit the alert for the emergency message on the plurality of broadcast subchannels and to transmit the at least one message segment associated with the emergency message on the plurality of broadcast subchannels within an affected area. The at least one message segment is often staggered in time by a time shift for transmission on the plurality of broadcast subchannels, wherein the time shift substantially corresponds to a transmission time of a full message on one broadcast subchannel divided by a number of the plurality of broadcast subchannels. Additionally, the transceiver 250 is configured to transmit the alert and the at least one message segment associated with the emergency message a plurality of times.

When the communication element 210 performs as a mobile station within an affected area of a communication system, the transceiver 250 is configured to receive the alert of the emergency message on the plurality of broadcast subchannels and to receive the at least one message segment associated with the emergency message on the plurality of broadcast subchannels. The emergency message may include a text message. The processor 220 of the mobile station is configured to reconstruct the emergency message from the at least one message segment associated therewith. The processor 220 of the mobile station is also configured to reconstruct the emergency message from a plurality of message segments. The alert and the emergency message (and/or segments thereof) may be stored in the memory 230. The at least one message segment is often staggered in time by a time shift on the plurality of broadcast subchannels, wherein the time shift substantially corresponds to a transmission time of a full message on one broadcast subchannel divided by a number of the plurality of broadcast subchannels. Additionally, the transceiver 250 is configured to receive the alert and the at least one message segment associated with the emergency message a plurality of times.

Figure 3:
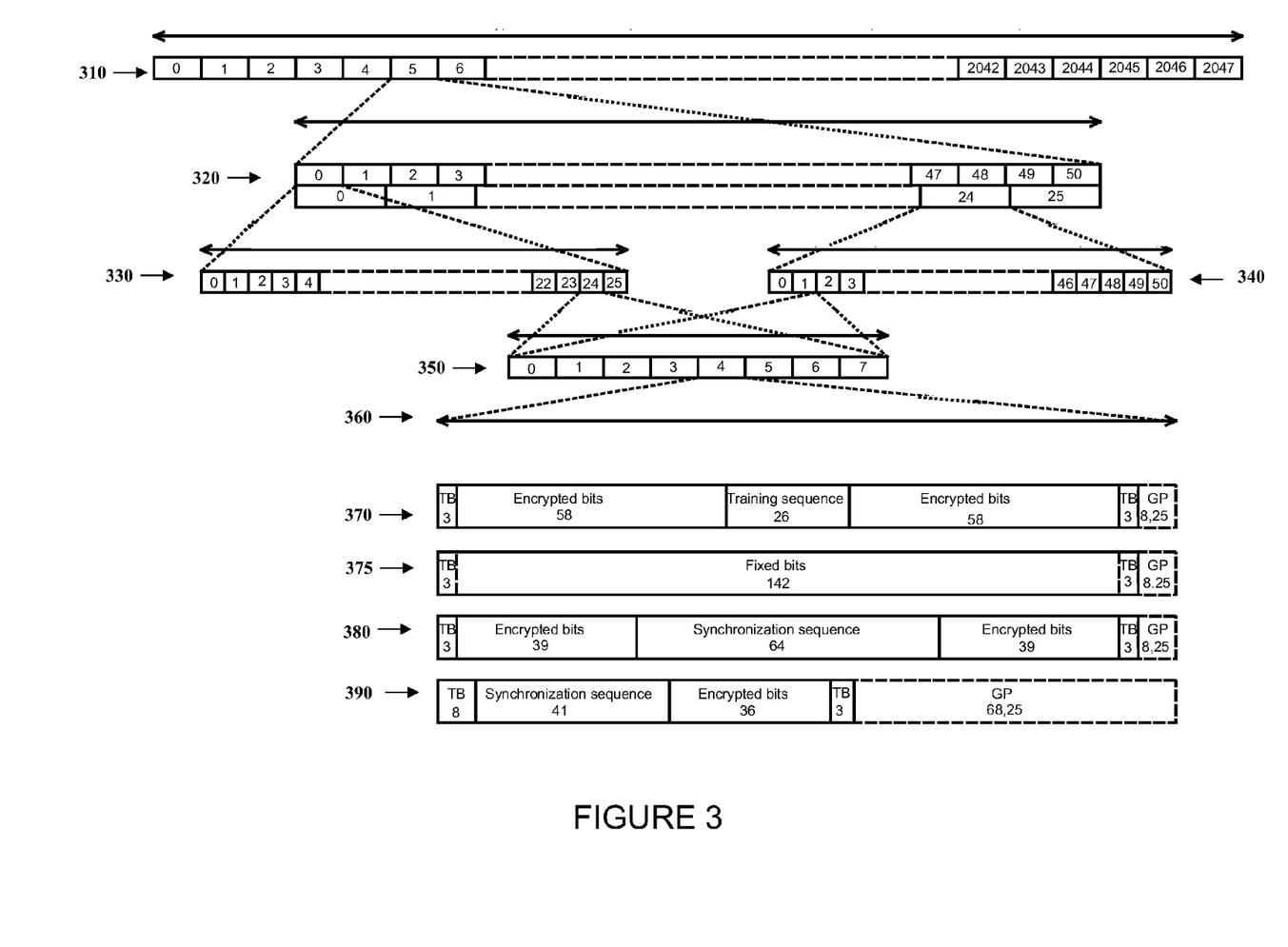
FIGS. 3 and 4 illustrate diagrams of a general time division multiple access frame structure employed in a cellular communication systems such as GSM, constructed according to an embodiment of the present invention.
Figure 4:
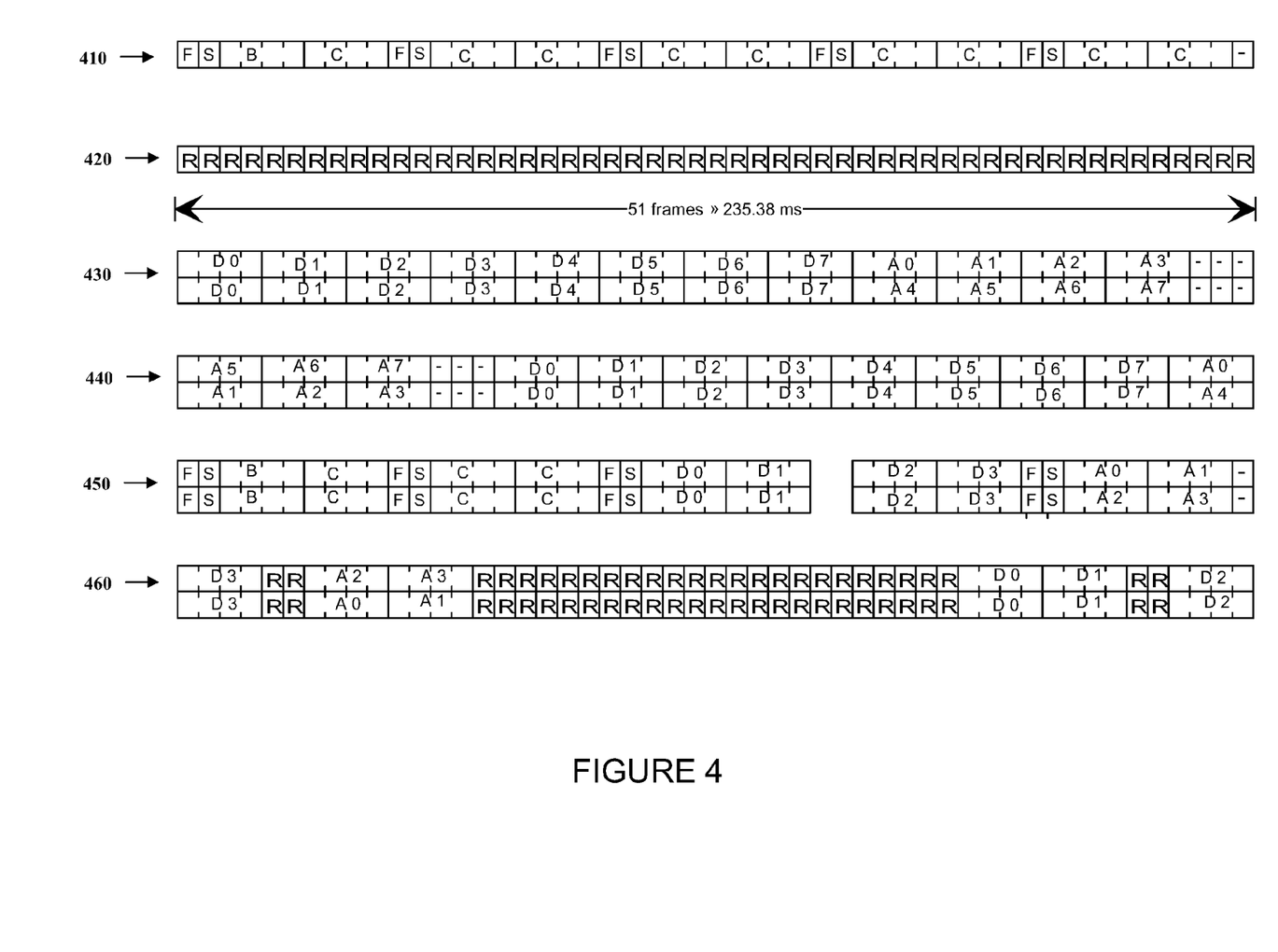

Turning now to FIGS. 3 and 4, illustrated are diagrams of a general time division multiple access ("TDMA") frame structure demonstrating in a cellular communication systems such as GSM how individual bits forming a communication message are assembled into a time slot, how time slots are joined to form a multiframe, how multiframes are joined to form a superframe, and how, in turn, superframes are joined to form a hyperframe. The present embodiments illustrate a 51-frame multiframe. The frame structure designated 310 provides a hyperframe that equals two (2) 048 superframes or two (2) 715,648 TDMA frames (3 h 28 min 53 s 760 ms), as shown in FIG. 3. The frame structure designated 320 provides a superframe that equals one (1) 326 TDMA frames (6, 12 s) (=51 (26-frame) multiframes or 26 (51-frame) multiframes). The frame structure designated 330 provides one (1) (26-frame) multiframe that equals 26 TDMA frames (120 ms). The frame structure designated 340 provides one (1) (51-frame) multiframe that equals 51 TDMA frames (3060/13 ms). The frame structure designated 350 provides one (1) TDMA frame that equals eight time slots (120/26 or 4,615 ms). As illustrated by the arrow designated 360, one (1) time slot equals 15,625 symbol durations (15/26 or 0.577 ms), wherein one (1) symbol duration equals 48/13 or 3.69 µs. It should also be noted that for Gaussian minimum shift keying ("GMSK") modulation, one symbol is one bit and for 8 phase shift keying ("8PSK") modulation, one symbol equals three bits. Additionally, the frame structures designated 370, 375, 380, 390 represent a normal burst ("NB"), frequency correction burst ("FB"), synchronization burst ("SB") and access burst ("AB"), respectively. The numbers shown in many of the foregoing frame structures are provided in symbols and the designation "TB" represents tail bits and the designation "GP" represents the guard period.

FIG. 4 provides more detail about the 51-frame multiframe illustrating the structure of a stand-alone dedicated control channel ("SDCCH") with two control channel options. The frame structure designated 410 illustrates a downlink broadcast control channel ("BCCH") and a common control channel ("CCCH"). The frame structure designated 420 illustrates an uplink BCCH and CCCH. The frame structure designated 430 illustrates a downlink eight stand-alone dedicated control channel ("8 SDCCH/8"). The frame structure designated 440 illustrates an uplink 8 SDCCH/8. The frame structure designated 450 illustrates a downlink BCCH and CCCH, 4 SDCCH/4. The frame structure designated 460 illustrates an uplink BCCH and CCCH, 4 SDCCH/4. The designators "F" represents a TDMA frame for frequency correction burst, "B" represents a TDMA frame for BCCH, "D" represents a TDMA frame for SDCCH, "R" represents a TDMA frame for random access channel ("RACH"), "S" represents a TDMA frame for synchronization burst, "C" represents a TDMA frame for CCCH, and "A" represents a TDMA frame for slow associated control channel ("SDCCH/C"). In a combined case, four stand-alone dedicated control channels are multiplexed in the same time slot with common control channels (a broadcast control channel and a common control channel). Alternatively, eight stand-alone dedicated control channels occupy a full time slot. In either option, if a cellular broadcast channel is assigned, it will use the resources of stand-alone dedicated control channel number 2.

From FIG. 4, one can see that one stand-alone dedicated control channel radio block (including four timeslots in four consecutive time division multiple access frames) occurs once per 235.38 milliseconds ("ms"). From this sequence of radio blocks, the first four are assigned for the basic cellular broadcast channel, the following four are assigned for the extended broadcast control channel, and the sequence then repeats. The cellular broadcast channel frame number carrying the first radio block of the basic cellular broadcast channel is described by a formula in Section 6.5.4 of 3GPP TS 05.02, cited above.

Figure 5:
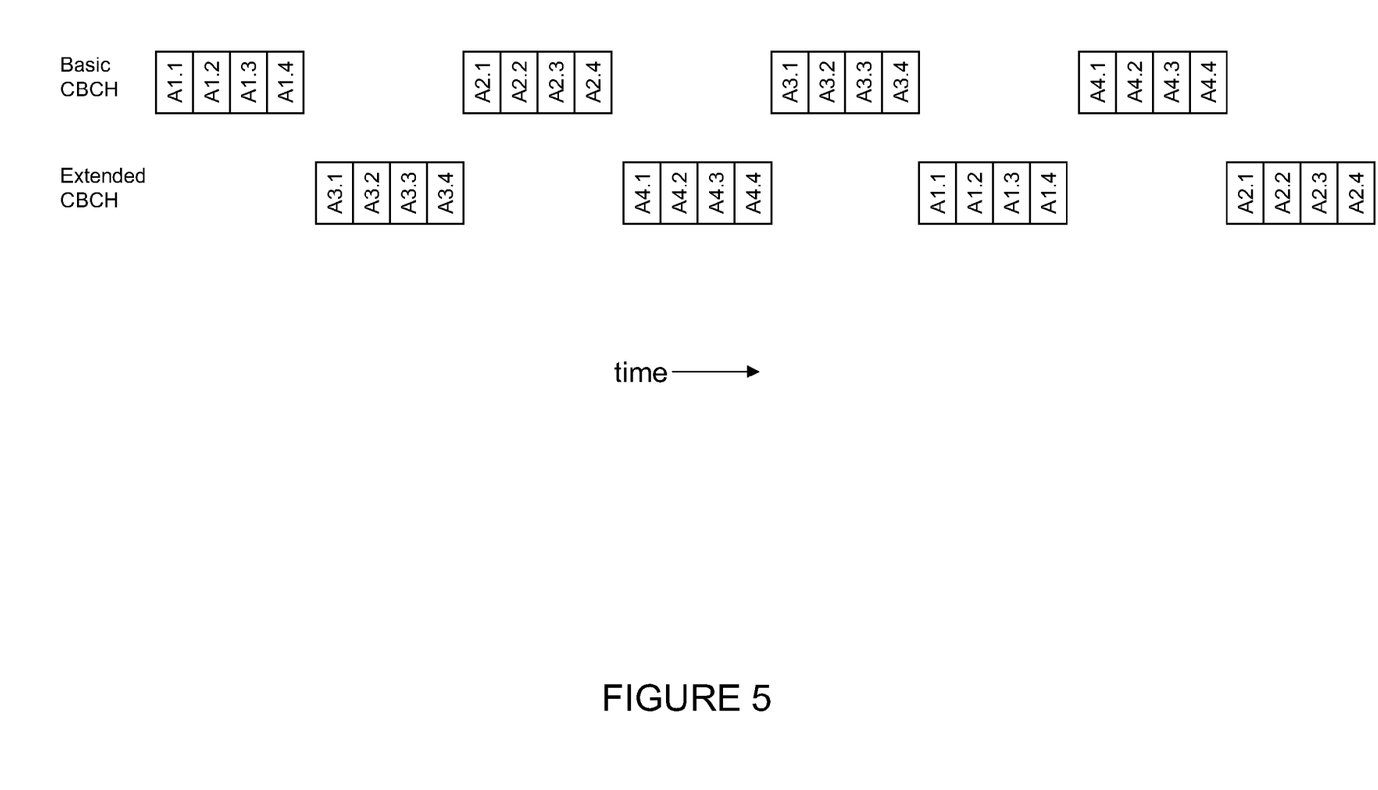
FIG. 5 illustrates a diagram of an embodiment of a cellular broadcast service message, constructed in accordance with an embodiment of the present invention.

Turning now to FIG. 5, illustrated is a diagram of an embodiment of a cellular broadcast service message in accordance with the principles of the present invention. The cellular broadcast service message, in this example, occupies 16 cellular broadcast channel radio blocks, shown as radio blocks A1.1 through A4.4. The notation "Ax.y" refers to a single radio block on an equivalent radio resource of a slow dedicated control channel. The time scale shows the order in time of each cellular broadcast transmission, such as transmission Ax.y, as well as the sequence of occurrence of each radio block. Four radio blocks in a row carry the basic cellular broadcast channel message. The next four carry the extended cellular broadcast channel message. The same cellular broadcast service message is transmitted on both cellular broadcast channel subchannels. Transmission on each subchannel, however, is staggered, preferably 50% in time. The illustrated sequence may be repeated multiple times. Reception time is reduced roughly to one half (approaching 50% for a long message) using this message scheduling arrangement with a mobile station capable of combining data from two subchannels.

In the example illustrated in FIG. 5, a receiver of a mobile station can receive radio blocks A1 and A2 from the basic cellular broadcast channel (designated "Basic CBCH"), and radio blocks A3 and A4 from the extended cellular broadcast channel (designated "Extended CBCH"). At another reception start time, radio blocks A4 and A1 are received from the basic cellular broadcast channel (Basic CBCH), and radio blocks A2 and A3 from the extended cellular broadcast channel (Extended CBCH). In another example, the cellular broadcast message includes four radio blocks A1.2 to A1.4 as illustrated in FIG. 5. Also, in this example, the maximum message delivery time can be reduced significantly because of the inherent staggering of the two cellular broadcast channel subchannels, even if parallel reception from different subchannels would not occur. At one reception start time, the message would be decoded from the basic channel from radio blocks A1.1 to A1.4. At another reception starting time, the individual radio blocks may be combined from different subchannels (e.g., starting from radio blocks A1.3 to A1.4 on the basic cellular broadcast channels and radio blocks A1.1 to A1.2 from the extended cellular broadcast channels).

Although embodiments have been described with reference to GERAN, GSM, TDMA, and other particular cellular communication system implementations, applications of the present invention are not so limited. As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage medium embodying computer program code (i.e., software or firmware) thereon for execution by the computer processor for use in a base station or a mobile station of a communication system.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to transmit an emergency broadcast message, as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising: a processor; and a memory including computer program code, the memory and the computer program code configured, with the processor, to cause the apparatus at least to:
receive an emergency message via a receiver comprising a basic cellular broadcast channel, designated as a first cellular broadcast control channel, and an extended cellular broadcast channel, designated as a second cellular broadcast control channel; whereby
receiving at least a first portion of the emergency message on the first cellular broadcast control channel,
wherein the emergency message occupies a plurality of blocks, and the first portion on the first cellular broadcast control channel comprises some but not all of the plurality of blocks, and
wherein the first cellular broadcast control channel is received over multiple timeslots in a time domain; and
receiving at least a second portion of the emergency message on the second cellular broadcast control channel,
wherein the second portion on the second cellular broadcast control channel comprises remaining blocks of the emergency message not in the first portion of the blocks and both the first and second portions of the blocks contain the entire emergency message,
wherein the second cellular broadcast control channel is received over multiple timeslots in the time domain, and
wherein the first portion is received in blocks in certain ones of the multiple timeslots and the second portion is received in blocks in different ones of the multiple timeslots; and
reconstruct said emergency message from the first and second portions.

2. The apparatus according to claim 1 wherein said emergency message includes a text message.

3. The apparatus according to claim 1 wherein said processor and memory are configured to receive said emergency message a plurality of times on at least one of the first or second cellular broadcast control channels.

4. The apparatus as recited in claim 1 wherein the emergency message is received in its entirety on both the first and the second cellular broadcast control channels.

5. The apparatus according to claim 1 wherein said apparatus is a mobile station of a communication system.

6. The apparatus according to claim 1, wherein content of the emergency message is in a sequence from blocks earlier in the sequence to blocks later in the sequence, wherein first portion comprises content from blocks earlier in the sequence and the second portion comprises content from blocks later in the sequence.

7. The apparatus according to claim 6, wherein the content on the first and second cellular broadcast control channels are received such that blocks later in the sequence are received on the second cellular broadcast control channel before it is possible to receive the same blocks that are later in the sequence on the first cellular broadcast control channel.

8. A computer program product comprising program code stored in a non-transitory computer readable medium for use with a computer, the computer program code, when executed by the computer, configured to cause the computer to:
receive an emergency message via a receiver comprising a basic cellular broadcast channel, designated as a first cellular broadcast control channel, and an extended cellular broadcast channel, designated as a second cellular broadcast control channel; whereby
receiving at least a first portion of the emergency message on the first cellular broadcast control channel,
wherein the emergency message occupies a plurality of blocks, and the first portion on the first cellular broadcast control channel comprises some but not all of the plurality of blocks, and
wherein the first cellular broadcast control channel is received over multiple timeslots in a time domain; and
receiving at least a second portion of the emergency message on the second cellular broadcast control channel,
wherein the second portion on the second cellular broadcast control channel comprises remaining blocks of the emergency message not in the first portion of the blocks and both the first and second portions of the blocks contain the entire emergency message,
wherein the second cellular broadcast control channel is received over multiple timeslots in the time domain, and
wherein the first portion is received in blocks in certain ones of the multiple timeslots and the second portion is received in blocks in different ones of the multiple timeslots; and
reconstruct said emergency message from the first and second portions.

9. A method, comprising:
receiving an emergency message via a receiver comprising a basic cellular broadcast channel, designated as a first cellular broadcast control channel, and an extended cellular broadcast channel, designated as a second cellular broadcast control channel; whereby
receiving at least a first portion of the emergency message on the first cellular broadcast control channel,
wherein the emergency message occupies a plurality of blocks, and the first portion on the first cellular broadcast control channel comprises some but not all of the plurality of blocks, and
wherein the first cellular broadcast control channel is received over multiple timeslots in a time domain; and
receiving at least a second portion of the emergency message on the second cellular broadcast control channel,
wherein the second portion on the second cellular broadcast control channel comprises remaining blocks of the emergency message not in the first portion of the blocks and both the first and second portions of the blocks contain the entire emergency message, wherein the second cellular broadcast control channel is received over multiple timeslots in the time domain, and wherein the first portion is received in blocks in certain ones of the multiple timeslots and the second portion is received in blocks in different ones of the multiple timeslots; and reconstructing said emergency message from the first and second portions.

10. The method according to claim 9 wherein said emergency message includes a text message.

11. The method as recited in claim 9 further comprising transmitting at least one of said first portion or said second portion a plurality of times.

12. An apparatus comprising a processor and a memory including computer program code; the memory and the computer program being code configured, with the processor, to cause the apparatus at least to:

accept an emergency message; and transmit the emergency message to occupy blocks with a basic cellular broadcast channel, designated as a first cellular broadcast control channel, and an extended cellular broadcast channel, designated as a second cellular broadcast control channel; whereby transmitting a first portion of the emergency message to occupy a plurality of blocks on the first cellular broadcast control channel, wherein the first portion is some but not all of the emergency message, and wherein the first cellular broadcast control channel is transmitted over multiple timeslots in a time domain; and transmitting a second portion of the emergency message to occupy the number of blocks on the second cellular broadcast control channel, wherein the second portion is a remainder of the emergency message, wherein the second cellular broadcast control channel is transmitted over multiple timeslots in the time domain, and wherein the first portion is transmitted in blocks in certain ones of the multiple timeslots and the second portion is transmitted in blocks in different ones of the multiple timeslots.

13. The apparatus according to Claim 12 wherein said emergency message includes a text message.

14. The apparatus according to claim 12 wherein said processor and memory are configured to transmit said first portion and said second portion a plurality of times.

15. The apparatus according to claim 12 wherein said processor and memory are configured to transmit said first portion and said second portion within an affected area of a communication system.

16. The apparatus according to claim 12 wherein said apparatus is a base station of a communication system.

17. A method, comprising:

accepting an emergency message; and transmitting the emergency message to occupy blocks with a basic cellular broadcast channel, designated as a first cellular broadcast control channel, and an extended cellular broadcast channel, designated as a second cellular broadcast control channel; whereby transmitting a first portion of the emergency message to occupy a plurality of blocks on the first cellular broadcast control channel, wherein the first portion is some but not all of the emergency message, and wherein the first cellular broadcast control channel is transmitted over multiple timeslots in a time domain; and transmitting a second portion of the emergency message to occupy the number of blocks on the second cellular broadcast control channel, wherein the second portion is a remainder of the emergency message, wherein the second cellular broadcast control channel is transmitted over multiple timeslots in the time domain, and wherein the first portion is transmitted in blocks in certain ones of the multiple timeslots and the second portion is transmitted in blocks in different ones of the multiple timeslots.

18. The method according to claim 17 wherein said emergency message includes a text message.

* * * * *